April 9, 1940.　　　A. R. PERKINS　　　2,196,939
VEHICLE FRAME AND PANEL ATTACHING MEANS
Filed Feb. 27, 1939　　　3 Sheets-Sheet 1
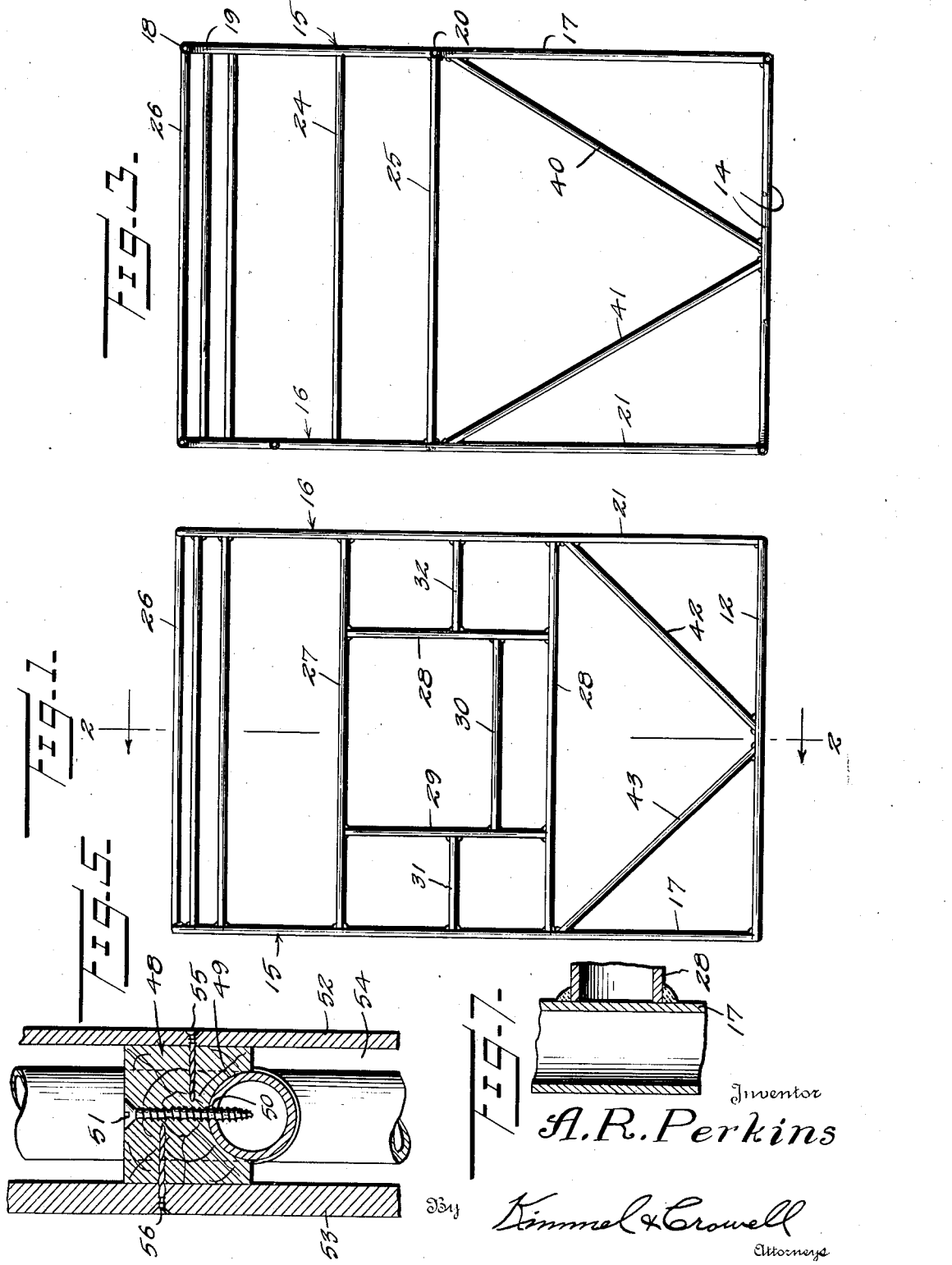
Inventor
A. R. Perkins
By Kimmel & Crowell
Attorneys April 9, 1940.　　　　A. R. PERKINS　　　　2,196,939
VEHICLE FRAME AND PANEL ATTACHING MEANS
Filed Feb. 27, 1939　　　3 Sheets-Sheet 2
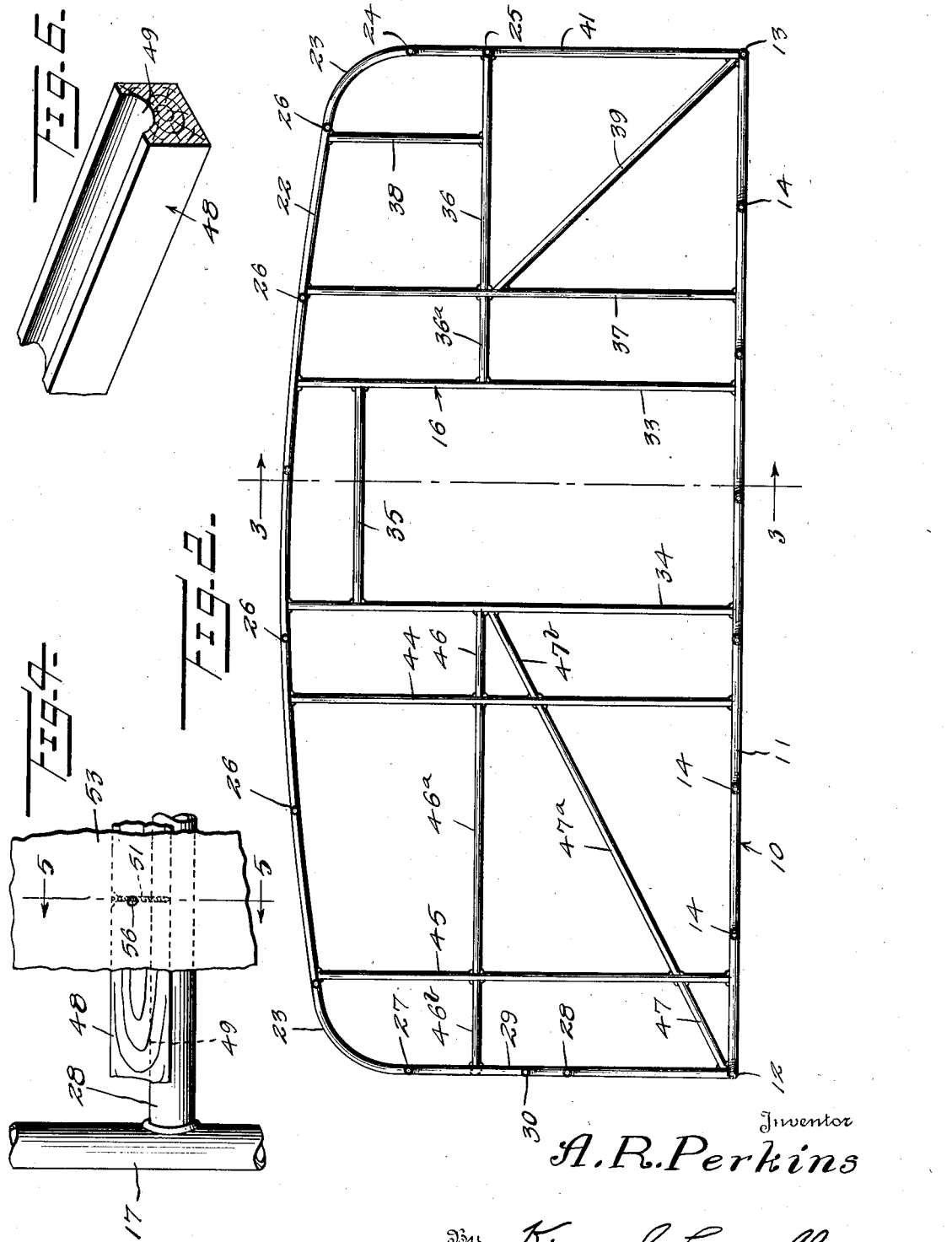
Inventor
A. R. Perkins
By Kimmel & Crowell
Attorneys

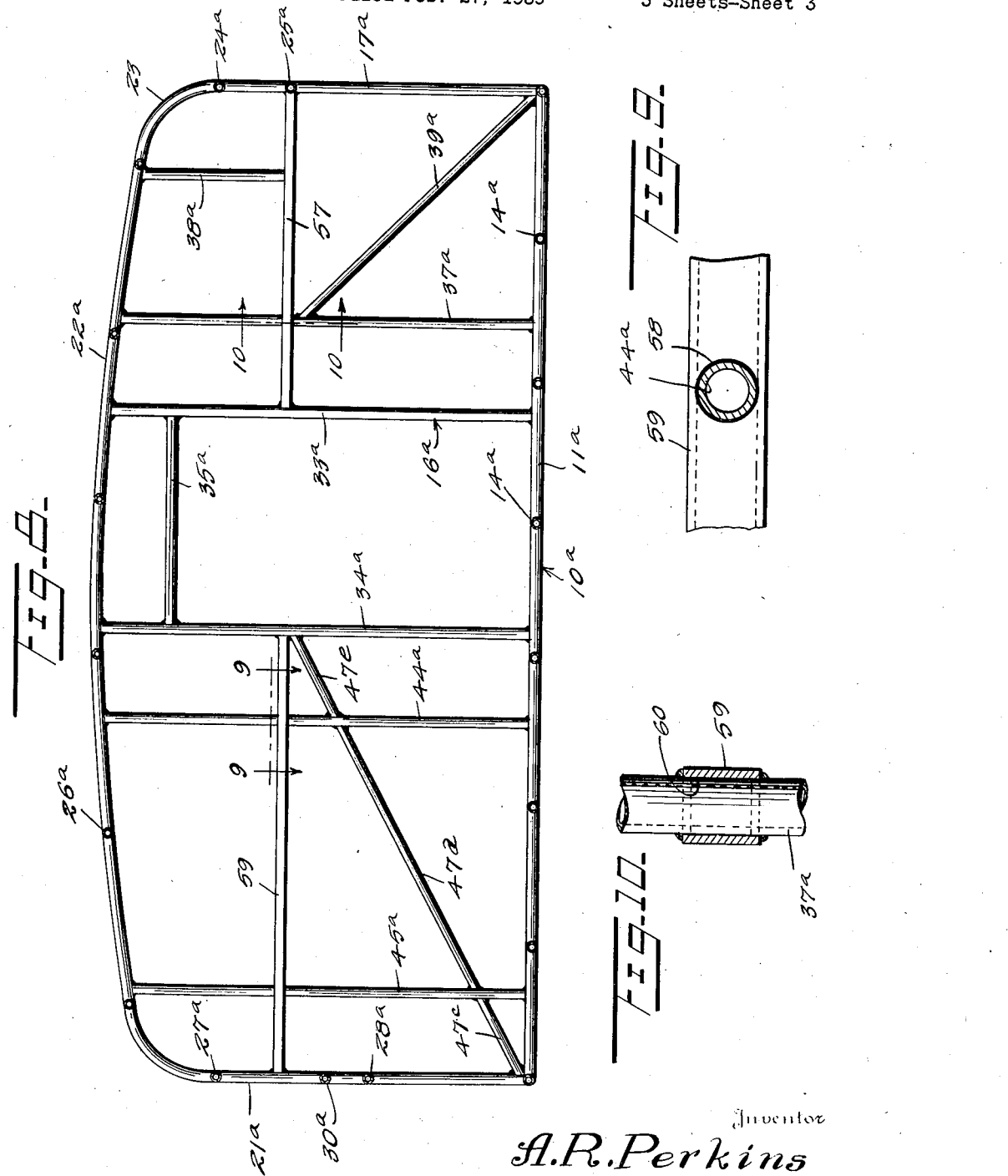

Patented Apr. 9, 1940

2,196,939

UNITED STATES PATENT OFFICE 2,196,939

VEHICLE FRAME AND PANEL ATTACHING MEANS

Arthur R. Perkins, Oneonta, N. Y.

Application February 27, 1939, Serial No. 258,787

2 Claims. (Cl. 296—28)

This invention relates to trailer body constructions and more particularly to an improved trailer body frame construction.

An object of this invention is to provide an improved trailer body structure of tubular material which permits the welding of substantially all of the joints comprising the frame so as to provide a rigid frame structure which is of relatively light weight.

Another object of this invention is to provide a tubular body for a trailer and also to provide an improved means whereby the inner and outer walls or panels may be secured to the frame.

A further object of this invention is to provide an improved spacer member for the inner and outer walls or panels which is so constructed that it may be readily secured to the metal frame, the spacer being preferably made out of wood and attached to the metal frame by self threading screws or fastening devices.

A still further object of this invention is to provide in combination a metal frame structure formed of tubular frame members and grooved spacer members adapted to be attached to the tubular members and having a thickness substantially greater than the diameter of the tubular members so that the space between the inner and outer walls or panels will provide an air space or insulation between the inner and outer walls or panels.

To the foregoing objects and to others which may hereinafter appear, the invention consists of the novel construction, combination and arrangement of parts as will be more specifically referred to and illustrated in the accompanying drawings, wherein embodiments of the invention are shown, but it is to be understood that changes, variations and modifications may be resorted to which fall within the scope of the invention as claimed.

In the drawings:

Figure 1 is a detail front elevation of a trailer body frame structure constructed according to an embodiment of this invention, Figure 2 is a longitudinal section taken on the line 2—2 of Figure 1, Figure 3 is a transverse section taken on the line 3—3 of Figure 2, Figure 4 is a detail side elevation partly broken away of a frame structure with a spacer and panel secured thereto, Figure 5 is a sectional view taken on the line 5—5 of Figure 4, Figure 6 is a perspective view of one of the spacer members, Figure 7 is a fragmentary sectional view showing the manner of securing angularly related frame members together, Figure 8 is a longitudinal section partly in detail showing a modified form of body structure, Figure 9 is a sectional view taken on the line 9—9 of Figure 8, and Figure 10 is a sectional view taken on the line 10—10 of Figure 8.

Referring to the drawings, the numeral 10 designates generally a base or bottom frame structure comprising longitudinal side tubular frame members 11 and end frame members 12 and 13. The frame structure comprising the side members 11 and the end members 12 and 13 is preferably substantially rectangular in configuration and a plurality of transverse bars 14 extend between the side frame members 11 being welded at their ends to the frame members 11. The end members 12 and 13 are adapted to be fixedly secured as by welding or the like to the adjacent ends of the side members 11. In this manner a rigid base structure of rectangular configuration in plan is provided.

The floor for the trailer is adapted to be mounted on top of the transverse bracing or frame members 14 and may overlap the end members 12 and 13. Upstanding side members generally designated as 15 and 16 respectively are secured to the base member 10 and the side member 15 comprises vertically disposed end posts 17 and a longitudinally disposed and longitudinally curved top bar of tubular construction designated 18 which in the present instance is formed integral with the end members 17, the connection between the end members 17 and the longitudinal member 18 being in the form of an arc as at 19. A horizontally disposed intermediate bar 20 is secured at the opposite ends thereof to the end members 17 at a point substantially mid-way between the bottom member 10 and the upper roof supporting member 18.

The side 16 which is shown in detail in Figure 2 comprises end members 21 which are secured at their lower ends as by welding to the junction between the side members 11 and the end members 13 of the bottom 10. An upper roof supporting member 22 is preferably formed integral with the end members 21 being longitudinally curved similar to the curvature of the upper member 18 and connected to the end members 21 by arcuate members 23. At one end of the frame structure a pair of transversely disposed tubular members 24 and 25 are secured to the end members 17 and 21 and are disposed in parallel relation to each other and to the end member 13. A plurality of roof supporting and side wall bracing members 26 are welded at their opposite ends to the upper members 18 and 22 being positioned in spaced apart relation along the length of the upper members 18 and 22 as shown in Figures 1, 2 and 3.

The opposite end of the frame structure is provided with a pair of transversely disposed frame members 27 and 28 which are welded at their opposite ends to the adjacent end members 17 and 21. A pair of vertically disposed tubular members 28 and 29 are secured at their opposite ends between transverse members 27 and 28 and positioned inwardly from the end members 17 and 21 as shown in Figure 2. These vertical members 28 and 29 provide supporting means for a window frame structure and preferably a horizontally disposed tubular member 30 is secured between the two vertical members 28 and 29 above the lower member 28. A bracing member 31 is secured between the vertical member 29 and the end member 17 and a second bracing member 32 is secured between the vertical member 28 and the adjacent end member 21.

A pair of vertically disposed tubular members 33 and 34 are secured between the side rail 11 at one side of the frame structure and the upper frame member 22 and a horizontally disposed door frame member 35 is secured between the uprights 33 and 34 as by welding or the like. A horizontally disposed frame member 36 is secured at one end to the upright 33 and at the opposite end to the end member 21. A vertically disposed frame member 37 is positioned in parallel relation to the frame member 33 and if desired, this tubular member 37 may extend from the lower side member 11 to the upper member 22. The horizontal member 36 may be made in two parts with a relatively short part 36ª extending between the vertical member 37 and the vertical member 33. A relatively short vertical member 38 is secured as by welding at its lower end to the horizontal member 36 and at its upper end to the upper member 22. A diagonally disposed bracing member 39 is secured at its upper end to the junction between the horizontal member 36 and the vertical member 37 and at its lower end to the junction between the end member 21 and a side member 11.

A diagonally disposed bracing member 40 is secured at its upper end to a vertically disposed end member 17 as shown in Figure 3 and at its lower end to the end member 13 at a point substantially mid-way of the length of the end member 13. A second diagonally disposed bracing member 41 is secured at its upper end to the end member 21 and at its lower end is secured as by welding to the end member 13 adjacent the lower end of the bracing member 40. In this manner the two bracing members 40 and 41 will be disposed in V-shape and are adapted to firmly brace one end of the frame structure. The opposite end of the frame structure is provided with a diagonally disposed bracing member 42 which at its upper end is welded to the vertical member 21 just below the horizontal member 28 and the lower end of the bracing member 42 is welded adjacent the center of the end member 12. A second bracing member 43 is secured at its upper end to the adjacent end member 17 and at its lower end to the bottom end member 12 adjacent the connection of the bracing member 42. These two bracing members 42 and 43 are adapted to firmly brace the side walls at the end opposite from the bracing members 40 and 41. The bracing members 42 and 43 in the present instance are positioned at the front end of the frame and the bracing members 40 and 41 are positioned at the rear end of the frame.

A vertically disposed side member 44 is positioned in spaced relation to the vertical door frame member 34 being secured at its lower end to the adjacent side member 11 and at its upper end to the upper member 22. A second vertical member 45 is positioned adjacent the forward end of the frame structure being secured at its lower end to the horizontal bottom member 11 and at its upper end to the upper member 22 adjacent the forward end of the upper member 22. A horizontally disposed and relatively short tubular member 46 is welded between the two members 34 and 44 at a point intermediate the ends of these two members and a second horizontal member 46ª is welded between the two members 44 and 45 in alignment with the short member 46. A third horizontal member 46ᵇ is welded between the front end member 21 and the vertical member 45 and is in alignment with the two members 46 and 46ª.

An upwardly and rearwardly inclined bracing member comprising tubular members 47, 47ª and 47ᵇ extends from the junction between the adjacent side member 11 and the end member 21, and in the present instance, the tubular member 47 is secured between the vertical member 45 and the junction between the bottom member 11 and the end member 21. The inclined member 47ª which is in alignment with the bracing member 47 is welded between the vertical member 45 and the vertical member 46. The inclined bracing member 47ᵇ is welded between the vertical member 34 and the vertical member 44 in axial alignment with the two members 47 and 47ª.

The tubular frame structure hereinbefore described is constructed substantially entirely out of tubular metal with the several pieces thereof welded at the joint between the pieces so that a very rigid and relatively light frame structure will be provided. If desired, the bottom members 11, 12 and 13 may be made relatively larger in diameter than the remaining members 14 and the tubular frame members extending thereabove, although if desired substantially all of the tubular frame members may be made from metal having substantially the same diameter.

In order to provide a means whereby the inner and outer walls or panels may be secured to the tubular frame structure hereinbefore described, I have provided a spacing and panel attaching member 48 in the form of an elongated strip of wood which is initially rectangular or square in transverse section and is provided in one side thereof with an arcuate and longitudinally extending groove 49. The groove 49 is adapted to receive a tubular frame member and in order to secure the spacing member 48 to the desired tubular member the tubular member may be provided with a hole 50 and a self-thread cutting screw 51 is threaded through the spacing member 48 and into the hole 50. This construction is clearly disclosed in Figure 5. In this manner the spacing and panel attaching member 48 will be firmly held on the metal frame structure, there being as many fastening screws 51 as may be desired or considered necessary so as to firmly hold the groove member 48 in applied position. The groove member 48 has a thickness or width substantially greater than the diameter of the tubular members forming the frame so that when an inner panel 52 and an outer panel or wall 53 are secured to the inner and outer faces of the channel member 48, a substantial air space 54 will be provided through which air is adapted to circulate and form an insulating means between the inner and outer walls of the trailer. The inner panel 52 is adapted to be secured to the channel member 48 as by screws or fastening members 55 and the outer panel or wall member 53 is adapted to be secured to the channel member 48 by fastening members 56 which are similar to the fastening members 55.

In the present instance, the fastening members 55 and 56 are constructed in the form of nails having a threaded periphery so that these nails or fastening members will rotate simultaneous with the driving thereof through the respective panels and into the spacing member 48. If desired the spacer members 48 may be secured to the tubular members comprising the bottom 10 so that the floor which is normally constructed of wood may be nailed tightly onto the bottom frame member 10.

The channel member 48 provides a novel attaching means whereby the inner and outer walls or panels may be firmly secured to the tubular frame structure and may be secured by ordinary nails or threaded nails which may be driven by the use of hammer directly into the channel member 48. In this manner the assembling of the inner and outer wall structure will be made relatively easy and at the same time the inner and outer wall structure will be firmly secured to the metal tubular frame so that the walls will not become loosened during the vibrations to which the trailer body may be subjected.

The frame or body structure hereinbefore described is adapted to have two or more wheels secured thereto and is also adapted to have a trailer hitch secured to the front end. The inner and outer wall members 52 and 53 may be constructed out of any suitable material which is adapted to be finished off in the desired manner. The frame structure being constructed of tubular material provides a relatively light frame so that when the entire trailer is assembled, the trailer body will not be unduly heavy, but at the same time will be sufficiently rigid in construction so that the frame will be able to withstand the various stresses or strains to which the frame may be subjected. By providing a frame structure entirely out of metal and preferably, out of tubular metal, the frame parts will not be apt to bend under normal strains or stresses and in the event of a collision the frame structure will be better able to withstand the shock than a wooden frame or a frame structure which may be bolted together or formed out of elongated solid bars. In addition, the use of tubular members provides a means whereby an air space for use as insulation may be provided between the inner and outer walls of the trailer, thus making it possible to insulate the walls of the trailer on all sides, ends and on the top.

In Figures 8 to 10 inclusive there is disclosed a slightly modified form of body frame structure wherein the bottom member 10a is formed of longitudinal or side members 11a and transversely disposed bars or members 14a. A side wall structure generally designated as 16a is secured to and extends upwardly of the bottom 10a and comprises an upper or top frame member 22a of longitudinally arcuate configuration which has vertically disposed end members 17a and 21a. A plurality of transversely extending top bars 26a are welded to the opposite ends thereof to the arcuate top member 22a and transversely extending end bars 24a and 25a are secured to the end port or supporting member 17a. The opposite end of the frame structure has secured thereto transverse bars 27a, 28a and 30a similar to the structure shown in Figure 2. A doorway or frame structure is formed within the side wall 16a by means of vertical tubular members 33a and 34a. A top rail 35a is welded at the opposite ends thereof to the vertical door members 33a and 34a at a point downwardly from the upper ends thereof. A vertical side wall member 37a is secured at its lower end to a lower side member 11a and at its upper end to the top member 22a. A bracing member 39a is secured at its lower end to the joint between an end member 17a and the bottom 11a and extends upwardly and inwardly on an angle to the vertical and is secured at its upper end to the vertical member 37a. A horizontally disposed bar or tubular member 57 extends between the vertical member 33a and an end member 17a and in the present instance this horizontal member 57 is constructed substantially square in transverse section as shown in Figures 9 and 10 and the vertical member 37a is extended through an opening or hole 58 and may be welded to the horizontal bar 57 on the upper and lower sides thereof. A relatively short vertical member 38a is welded at its lower end to the horizontal member 57 and at its upper end to the top member 22a. Preferably, the lower end of the vertical member 38a is extended through the square tubular member 57 and then welded to the upper and lower walls thereof so as to provide a rigid connection between these two members.

A second horizontally disposed frame bar 59 is provided in the side wall 16a and is secured at the opposite ends thereof to the end member 21 and to the door frame member 34a. The tubular member 59 is preferably constructed substantially square in transverse section and a tubular member 44a is secured at its lower end to the side member 11a and at its upper end to the top member 22a. The tubular member 44a is preferably round in transverse section and is extended through an opening 60 provided in the tubular member 59 and may then be welded to the upper and lower walls of the tubular member 59. A second vertical member 45a is secured at its lower end as by welding to the side member 11a and at its upper end to the top member 22a. The vertical member 45a is extended through openings provided in the upper and lower walls of the tubular member 59 similar to the construction shown in Figure 10 and then welded to the tubular member 59. The frame structure 16a may be pressed by a pressing member 47c which is secured at its lower end to the joint between the end member 21a and the bottom member 11a and is positioned on an upper inclination and secured at its upper end to the upright 45a. A second or intermediate bracing member 47d is secured in axial alignment with the bracing member 47c being welded at its lower end to the upright 45a and welded at its upper end to the upright 44a. A third bracing member 47e is disposed in axial alignment with the bracing members 47c and 47d and is secured as by welding between the uprights 34a and 44a.

The frame structures hereinbefore described may be used to form the bases for trailer bodies or for truck bodies used with what is termed "motorized units." The frame structure hereinbefore described will provide a rigid frame which is at the same time relatively light in weight, but of sufficient strength to withstand the strains to which the frame may be subjected.

What I claim is:

1. A metal body frame for vehicles comprising a horizontal bottom portion, a horizontal top portion, a pair of vertical side portions, a vertical front portion and a vertical rear portion, said portions being of skeleton form, said bottom portion including spaced parallel tubular side members, spaced parallel front and rear tubular end members and spaced parallel tubular reinforcing members between and having their ends connected to side members, each of said side portions including an upstanding tubular member formed of an arcuate top part and vertically disposed front and rear end parts merging at their upper ends into the ends of said arcuate part and connected at their lower ends to the ends of one of said side members, said top portion including spaced tubular members disposed at different levels arranged between and having their ends connected to said arcuate parts, said front portion including a frame structure arranged between and connected to said front end parts in spaced relation with respect to the ends of the latter and oppositely disposed upstanding tubular bracing means between the lower end of said structure and the said front end member of said bottom portion, said rear portion including superposed spaced parallel tubular members between and connected to said rear end parts in spaced relation with respect to the ends of the latter and upstanding oppositely disposed bracing means between the lower one of its tubular members and the rear end member of said bottom portion, one of said side portions including a tubular reinforcing member extending from one of its vertical end parts to the other of its vertical end parts, and the other of said side portions including vertical spaced parallel bracing members extending from its arcuate part to and connected to one of the side members of said bottom portion.

2. The invention as set forth in claim 1 having the said other of the side portions including a pair of spaced endwise opposed tubular longitudinal bracing members disposed lengthwise thereof and with one of such members secured to certain of its vertical bracing members and to its front end part and the other longitudinal bracing member being secured to the others of its vertical bracing member and to its rear end part, and the said other of the said side portions including a pair of oppositely extending spaced oppositely inclined upstanding bracing members one being secured to one of its vertical bracing members intermediate the ends of the latter and to the bottom of its front end part and the other upstanding inclined bracing member being secured to another one of its vertical bracing members intermediate the ends of the latter and to the bottom of its rear end part.

ARTHUR R. PERKINS.